United States Patent [19]

Bates

[11] 3,913,940
[45] Oct. 21, 1975

[54] VEHICLE SUSPENSIONS

[75] Inventor: Gregory John Bates, Whetstone, England

[73] Assignee: Dunlop Limited, London, England

[22] Filed: May 29, 1974

[21] Appl. No.: 474,185

[30] Foreign Application Priority Data
May 29, 1973 United Kingdom............ 25531/73

[52] U.S. Cl. .................... 280/124 R; 280/104.5 R
[51] Int. Cl.² ....................................... B60G 11/62
[58] Field of Search...... 280/124 R, 124 F, 104.5 R; 267/35

[56] References Cited
UNITED STATES PATENTS
3,078,104  2/1963  Chalmers.................... 280/124 F
3,155,397  11/1964  Stump........................ 280/104.5 X Primary Examiner—Philip Goodman
Attorney, Agent, or Firm—Stevens, Davis, Miller & Mosher

[57] ABSTRACT

A vehicle suspension for supporting a vehicle body upon a wheel and axle set using a Y-shaped lever frame having three limbs for location generally horizontally beneath the vehicle, the frame being attached at the ends of two of its limbs to the axle set and the other limb extending substantially longitudinally of the vehicle, a pair of main springs attached to and spaced apart transversely of the frame each adapted for acting vertically between the vehicle body and a point on the frame intermediate its ends, an air spring of substantially lower rate than the main springs attached to the other limb and adapted for connection to the vehicle body, and a sensor for sensing static height of the air spring and controlling the supply of air to the air spring whereby when attached to a vehicle static suspension deflection is determined largely by the high rate main springs and dynamic suspension deflection is largely determined by the lower rate air spring, the lever frame pivoting about an axis between the air spring and the main springs. The invention also provides a tandem axle arrangement.

8 Claims, 6 Drawing Figures

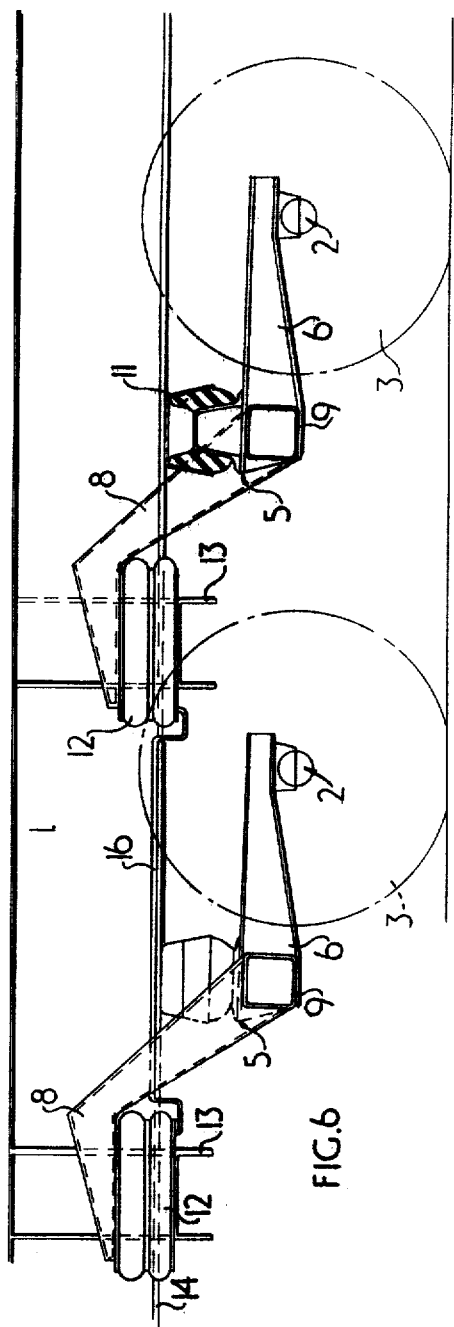

VEHICLE SUSPENSIONS

This invention relates to vehicle suspension and in particular, but not exclusively, to suspensions for the axles of commercial vehicles which use bonded rubber-to-metal springs.

Hitherto the use of rubber springs on commercial vehicles has resulted in high dynamic stiffness rates due to the high static stiffness rate necessary to maintain axle deflection between the unladen and laden conditions within an acceptable range.

According to one aspect of the present invention a vehicle suspension for supporting a vehicle body upon a wheel and axle set comprises a Y-shaped lever frame having three limbs for location substantially horizontally beneath the vehicle body, the frame being attached at the ends of two of its limbs to the axle set and the other limb extending substantially longitudinally of the vehicle, a pair of main springs attached to and spaced apart transversely of the frame each adapted for acting substantially vertically between the vehicle body and a point on the frame intermediate its ends, an air spring of substantially lower rate than the main springs attached to the other limb and adapted for connection to the vehicle body, and a sensor for sensing static height of the air spring and controlling the supply of air to the air spring whereby when the suspension is attached to a vehicle static suspension deflection is determined largely by the higher rate main springs and dynamic suspension deflection is largely determined by the lower rate air spring, the lever frame pivoting about an axis between the air spring and the main spring.

The main springs are preferably frusto-conical bonded rubber-to-metal springs.

The air spring is preferably provided with a resilient buffer which acts after a predetermined deflection of the air spring in compression, with a consequent increase in the rate of the spring. This causes the dynamic suspension rate to increase towards the full bump condition. Hence excessive axle movement due to dynamic loads is prevented.

If required additional damping may be provided by means of conventional dampers, i.e. hydraulic, acting between the vehicle body and the lever frame.

Another aspect of the invention provides a vehicle body having a suspension as described.

Further aspects of the invention will be made apparent from the following description of two embodiments of the invention, by way of example only, with reference to the accompanying diagrammatic drawings in which:

FIGS. 5 and 6 are plan and side elevations respectively of a tandem axle suspension for a commercial vehicle.

Figure 1:
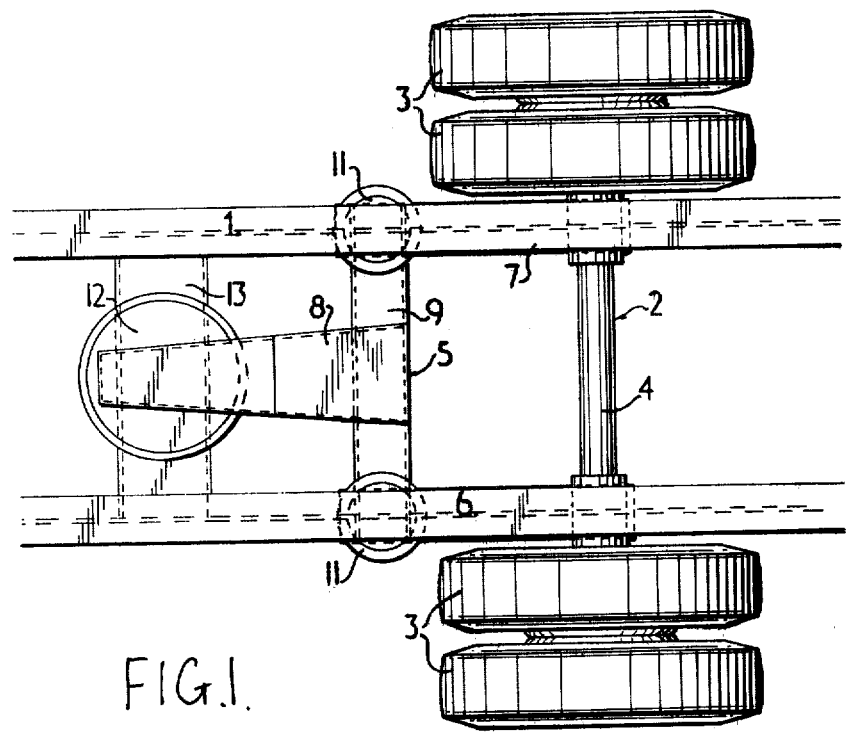
FIG. 1 is a plan view of a single axle commercial vehicle suspension according to the invention.
Figure 2:
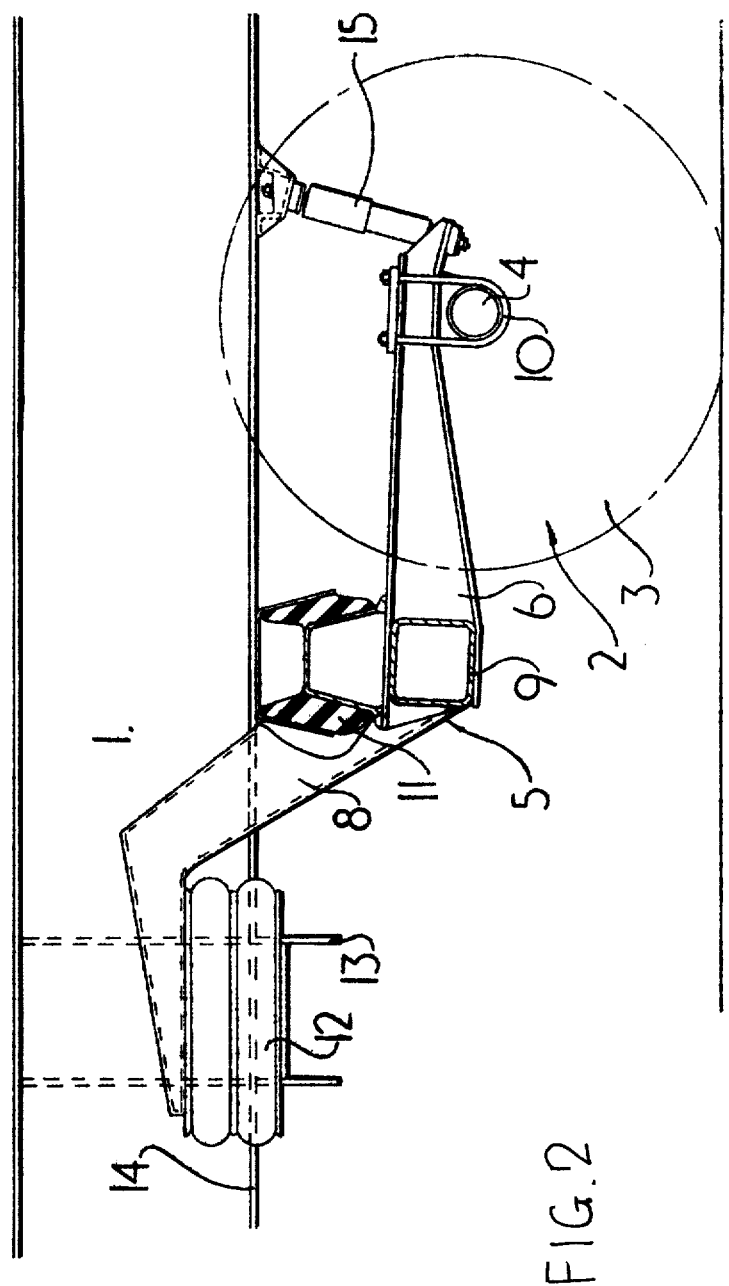
FIG. 2 is a side elevation of the suspension of FIG. 1 with one main spring sectioned.
Figure 3:
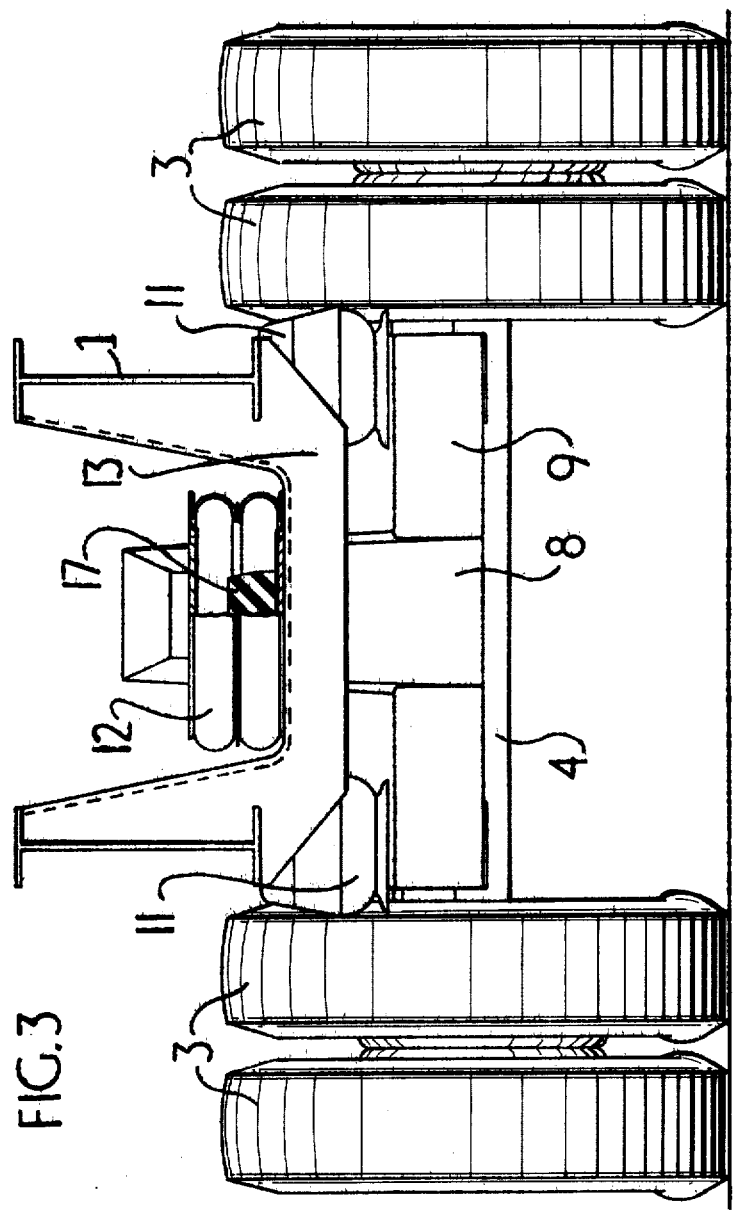
FIG. 3 is a view in the direction A in FIG. 1 with the air spring part sectioned.

The suspension illustrated in FIGS. 1, 2 and 3 is mounted beneath a vehicle frame 1 and comprises an axle set 2 carrying dual wheels 3 rotatably mounted on an axle 4. A generally Y-shaped frame 5 is formed by two I-section beams 6 and 7 and a rectangular section beam 8 interconnected by a square cross-section member 9 such that the three beams 6, 7 and 8 are mutually parallel, when viewed in plan as in FIG. 1.

The frame 5 is mounted beneath the vehicle body so that the beams 6, 7 and 8 extend longitudinally of the vehicle body and the beams 6 and 7 are connected to either end of the axle set 2 by means of U-bolts 10.

A pair of main springs 11 comprising frustoconical rubber springs having metal end plates bonded to the rubber is mounted between the frame 5 and the vehicle body 1, one being attached to either end of the cross member 9 and both acting substantially vertically to support the vehicle.

The forward end 8 of the form 5 is attached to one end of an air spring 12. The air spring 12 acts vertically between the end 8 of the lever 5 and a cross member 13 which is attached to the frame of the vehicle body 1. Thus the air spring acts between the vehicle body and the end 8 of the frame 5.

The air spring 12 is connected to an air supply by means of an inlet pipe 14.

A source of pressurized air is supplied to the inlet pipe 14 and the pressure is controlled by means of a control valve sensitive to the height of the air spring. This control valve is not illustrated but valves of this type are well known in air suspensions.

Hydraulic dampers 15 are provided acting between the outer ends of the lever ends 6 and 7 and the vehicle frame 1 to provide damping for the suspension.

Figure 4:
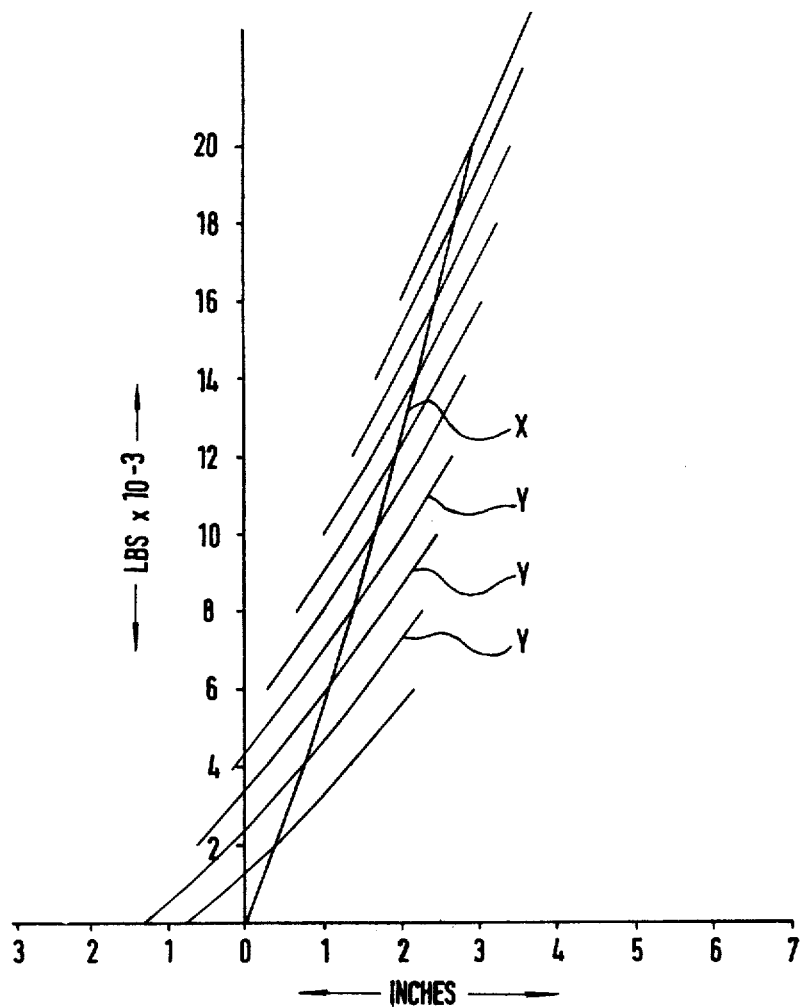
FIG. 4 is a graph of the suspension characteristics of the suspension illustrated in FIGS. 1, 2 and 3.

In operation deflection of the suspension due to vehicle weight (i.e. the static deflection) causes deflection of the main springs 11 together with compression of the air spring 12. The levelling valve senses this compression and supplies pressurized air to the air springs 12 to cause adjustment of the air spring back to its initial predetermined height. The levelling valve is arranged to have a comparatively long response time and this levelling operation typically takes 5 to 7 seconds. The static deflection characteristics of the suspension after the time required for adjustment is therefore largely that of the main springs and as seen in FIG. 4 this is arranged to have an appropriately high rate. (See line X which is the Static Stiffness Curve).

Dynamic deflection of the suspension such as occurs in running of the vehicle causes pivoting of the frame 5 about a horizontal pivotal axis which is between the air spring 12 and the main springs 11. The pivotal axis is near the main spring 11 and therefore the dynamic characteristics of the suspension are largely determined by the dynamic stiffness characteristic of the air spring which is chosen so that the stiffness rate of the suspension under dynamic conditions (see line Y in FIG. 4) is substantially lower than the static stiffness characteristic. FIG. 4 shows the static and dynamic stiffness characteristics (X and Y) from which it can be seen that the suspension static stiffness rate is substantially higher than the dynamic stiffness rate and thus the requirement of a low dynamic spring rate without incurring excessive deflection of the suspension when the vehicle is loaded has been achieved.

As the air spring is a relatively low rate a buffer cushion 17 is conveniently fitted within the air spring. This buffer is a resilient rubber mass which is contacted as the air spring reaches its maximum compression and prevents excessive spring deflection and hence axle movement under dynamic conditions.

Figure 5:
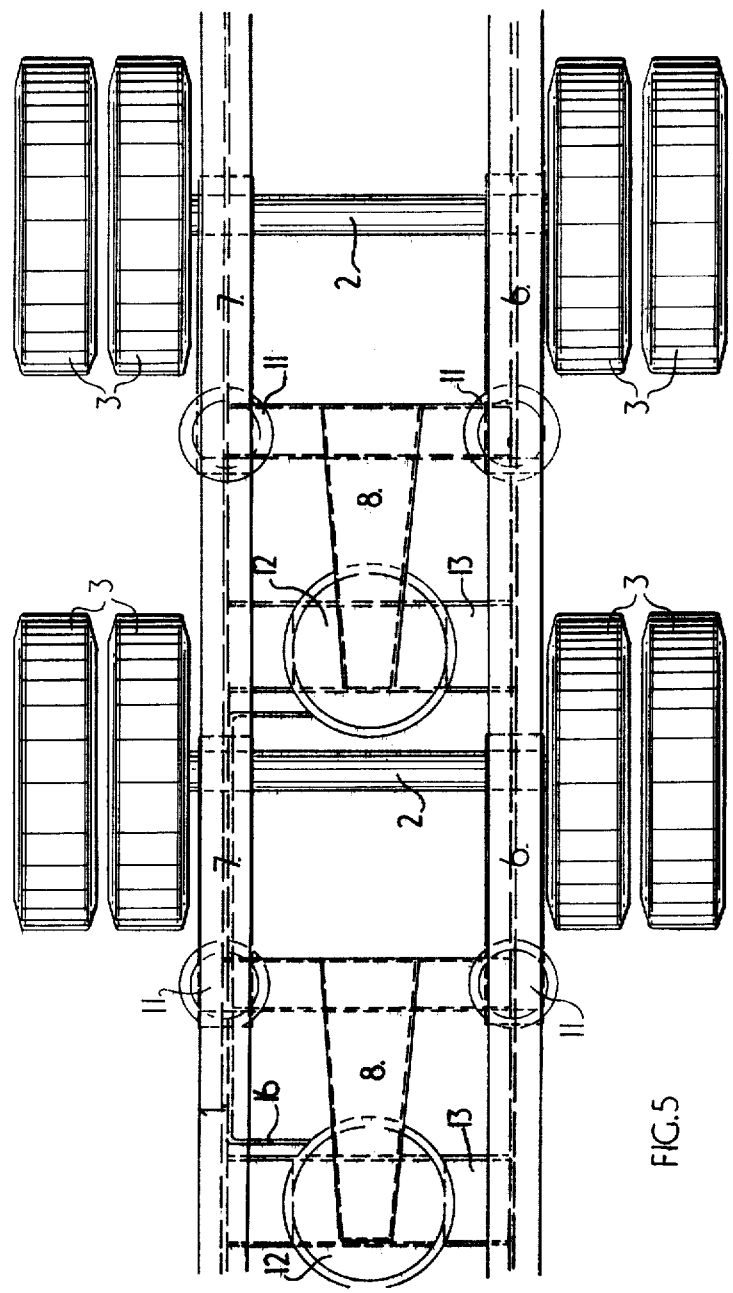

The arrangement shown in FIGS. 5 and 6 is a tandem axle for a commercial vehicle and uses two sets of suspension as described in the preceding paragraphs with the modification that the air springs 12 are interconnected by a balance pipe 16. This arrangement allows balance of the wheel loads as required to maintain axle loads substantially the same.

A single levelling valve is conveniently used for both axle sets and the air is supplied to the front spring by pipe 14 to the rear spring by means of the balance pipe 16. Some damping of the balancing arrangement can be provided if required by means of a restrictor valve in the balance pipe 16.

The above arrangements provide a required axle location for braking, cornering and maneuvering loads by means of the three springs locating each axle and the resulting compliance provides isolation against lateral and longitudinal high frequency vibrations. The geometry of the lever 5 arranges the main springs 11 so that they act at transversely spaced apart points which results in equivalent spring centers approximately at the vehicle track. This geometrical arrangement provides a high roll stiffness while maintaining equal wheel stiffness rates for one and two wheel bumps.

As an alternative to the air balance pipe 16 used in the tandem axle arrangement mechanical balancing means may be used; in the case using two separately supplied air springs, one for each axle, a balance lever between two air springs is suitable. Furthermore the suspension may be used either in the trailing configuration shown or in the well known leading arm configuration in the case of a tandem axle as a combination of both.

Having now described my invention, what I claim is:

1. A vehicle suspension for supporting a vehicle body upon a wheel and axle set comprising a Y-shaped lever frame having three limbs for location substantially horizontally beneath the vehicle body, the frame being attached at the ends of two of its limbs to the axle set and the other limb extending substantially longitudinally of the vehicle, a pair of main springs attached to and spaced-apart transversely of the frame each adapted for acting substantially vertically between the vehicle body and a point on the frame intermediate its ends, an air spring of substantially lower rate than the main springs attached to the other limb and adapted for connection to the vehicle body, and a sensor for sensing the static height of the air spring and controlling the supply of air to the air spring whereby when the suspension is attached to a vehicle static suspension deflection is determined largely by the higher rate main springs and dynamic suspension deflection is largely determined by the lower rate air spring, the lever frame pivoting about an axis between the air spring and the main springs.

2. A suspension according to claim 1 wherein the main springs comprise bonded rubber-to-metal springs.

3. A suspension according to claim 2 wherein the rubber-to-metal main springs are frusto-conical.

4. A suspension according to claim 3 wherein the secondary air spring comprises a resilient buffer which acts after a predetermined deflection of the air spring in compression to provide an increase in the rate of the spring.

5. A vehicle suspension for supporting a vehicle body upon a pair of wheel and axle sets arranged in tandem comprising a suspension according to claim 1 one for each axle.

6. A suspension according to claim 5 wherein the air springs of each axle set are interconnected such that they are each maintained at the same air pressure.

7. A suspension according to claim 5 wherein the air springs of each axle are interconnected by mechanical balance means whereby the compressive forces applied to each spring are maintained substantially the same.

8. A suspension according to claim 1 wherein hydraulic dampers are provided for mounting between the ends of the limbs attached to the axle set and the vehicle body.

* * * * *